(12) United States Patent
Bulloch

(10) Patent No.: US 8,066,598 B2
(45) Date of Patent: Nov. 29, 2011

(54) CHAIN TENSIONING APPARATUS WITH TEMPERATURE-BASED LEAKDOWN

(75) Inventor: Clyde A. Bulloch, Hartland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 549 days.

(21) Appl. No.: 12/248,090

(22) Filed: Oct. 9, 2008

(65) Prior Publication Data
US 2010/0093473 A1    Apr. 15, 2010

(51) Int. Cl.
*F16H 7/08* (2006.01)
*F16H 7/22* (2006.01)

(52) U.S. Cl. ......... 474/104; 474/109; 474/110; 474/111

(58) Field of Classification Search .................. 474/101, 474/104, 109, 110, 111, 140
See application file for complete search history.

(56) References Cited

U.S. PATENT DOCUMENTS
5,234,383 A * 8/1993 Harada et al. ................. 474/110
* cited by examiner

*Primary Examiner* — William E Dondero
(74) *Attorney, Agent, or Firm* — Quinn Law Group, PLLC

(57) ABSTRACT

An apparatus for tensioning a chain is provided that compensates for the affect of temperature on oil viscosity by providing, in addition to a continuously open oil leakage path, an additional leakage path open only at lower temperatures when oil is more viscous and leaks at a slower rate. Thus, overall oil leakage at lower temperatures is similar to that at higher temperatures, when the additional leakage path is closed, and the less viscous higher temperature oil leaks at a faster rate from the continuously open oil leakage path. Accordingly, the affect of temperature on hydraulic stiffness of the tensioner assembly is minimized.

10 Claims, 2 Drawing Sheets

CHAIN TENSIONING APPARATUS WITH TEMPERATURE-BASED LEAKDOWN

TECHNICAL FIELD

The invention relates to an apparatus for tensioning a chain, such as on an automotive engine.

BACKGROUND OF THE INVENTION

Chain drive tensioner assemblies are used to operate ancillary components associated with automotive engines. For example, chain drive tensioner assemblies are used to drive complex valve trains, balance shafts, oil pumps, high pressure fuel injection pumps and water pumps.

Known chain drive tensioner assemblies include a chain and a chain drive tensioner system that is operable to create an initial required tension on the chain. Known chain drive tensioner assemblies generally include a tensioner body and a tensioner piston attached to a shoe. Oil pressure within a hydraulic chamber of the tensioner body exerts pressure against the tensioner piston and shoe assembly, which engages the chain to create the required tension. Under impact forces from the chain, some oil leaks from the hydraulic chamber along an oil leakdown path with an orifice of fixed size. The stiffness of the chain drive tensioner assembly is controlled by the amount of oil leakage allowed from the hydraulic chamber. Increased tensioner stiffness leads to improved chain drive control. However, as oil temperature is increased, the viscosity of oil in the hydraulic chamber is decreased, and thus more oil leaks out of the leakdown path, decreasing stiffness of the assembly. When the oil temperature is relatively low, viscosity increases and therefore less oil can leak out of the fixed orifice leakdown path, increasing stiffness of the tensioner assembly and potentially causing the tensioner to experience "pump up" (i.e., an over-extension of the piston and shoe) which decreases chain drive control.

SUMMARY OF THE INVENTION

An apparatus for tensioning a chain is provided that compensates for the affect of temperature on oil viscosity by providing, in addition to a continuously open oil leakage path, an additional leakage path open only at lower temperatures when oil is more viscous and leaks at a slower rate. The additional leakage path is also referred to as a variable flow passage or second oil leakdown path. Thus, overall oil leakage at lower temperatures is similar to that at higher temperatures, when the additional leakage path is closed, and the less viscous higher temperature oil leaks at a faster rate from the continuously open oil leakage path. Accordingly, the affect of temperature on hydraulic stiffness of the tensioner assembly is minimized.

The apparatus includes a chain drive tensioner assembly operatively connected with the chain. The chain drive tensioner has a hydraulic chamber subjected to force from the chain. A first oil leakdown path provides continuous oil leakage from the hydraulic chamber when under force from the chain and a second oil leakdown path selectively provides additional oil leakage from the hydraulic chamber under predetermined temperature conditions when under force from the chain.

The chain drive tensioner assembly may include a tensioner body with a bore therein. The tensioner body defines first and second passages (i.e., the first and second leakdown paths) operatively connected with the tensioner bore. An actuator is provided that is movable in response to a predetermined temperature to block the second passage such that the first passage is operable to leak oil at both the first and second temperatures and the second passage is operable to leak oil at the first temperature but is blocked by movement of the actuator at the second temperature.

In one embodiment, the actuator is a thermal wax actuator, containing thermal wax that melts at a predetermined temperature, thereby expanding to move a piston that blocks the second passage. In another embodiment, the actuator is a pulse width modulated actuator that responds to a pulse width modulated current or voltage triggered by a control signal that corresponds with sensed oil temperature. Movement of the actuator in response to the pulse width modulated current or voltage may provide intermediate actuator positions in which the second passage is only partially opened, providing more fine tuning of the amount of oil leakage from the second passage as a function of temperature.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
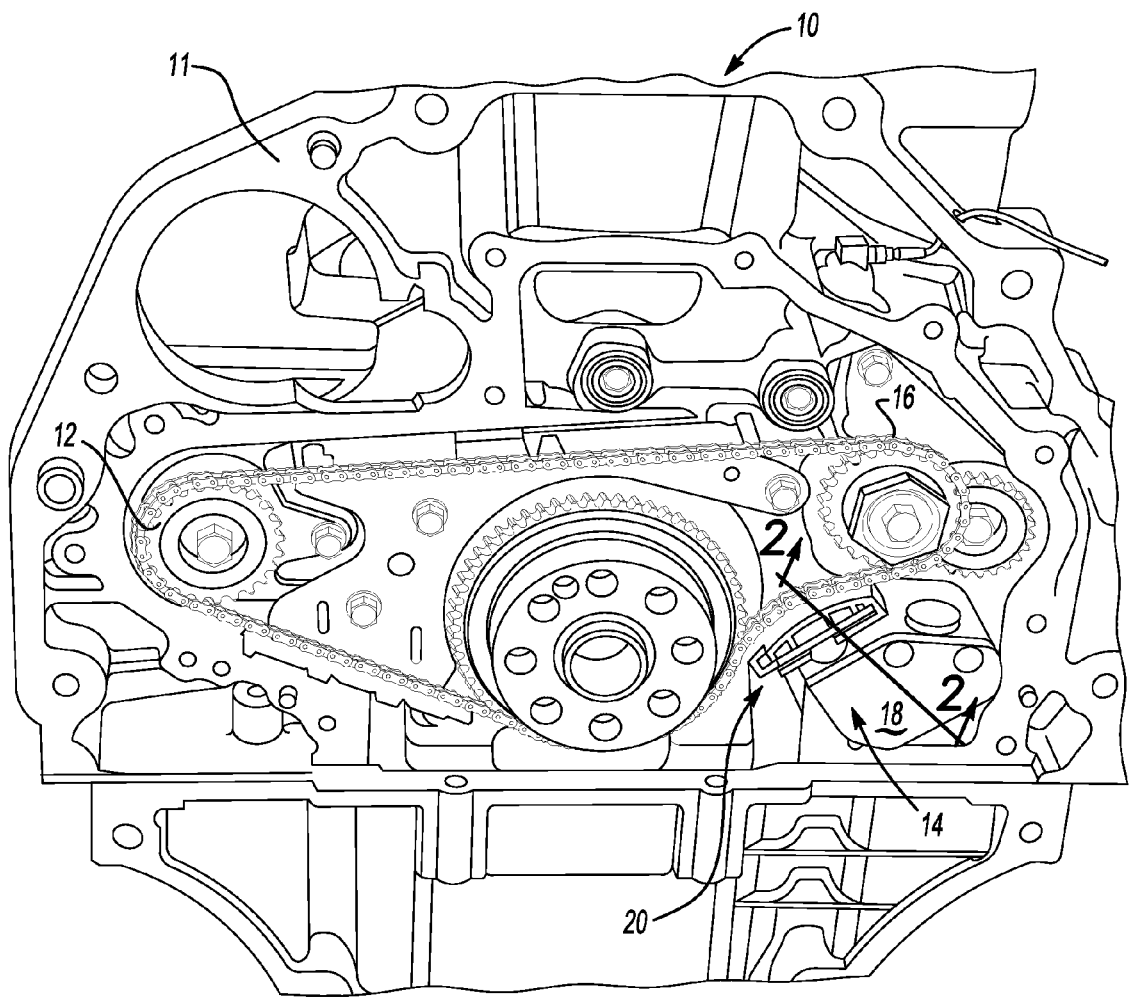
FIG. 1 is a schematic perspective illustration of an internal combustion engine with a chain driven balance shaft including a first embodiment of a chain drive tensioner assembly.

Referring to the drawings, wherein like reference numbers refer to like components, FIG. 1 is a schematic perspective illustration of an engine assembly 10 that includes an internal combustion engine 11 and a chain driven component, i.e., a balance shaft drive, indicated generally at 12.

An apparatus referred to as a chain drive tensioner assembly 14 tensions a drive chain 16 of the chain driven balance shaft drive 12. The chain drive tensioner assembly 14 includes a tensioner body 18 and tensioner piston assembly 20 in contact with the drive chain 16.

It should be appreciated that, while the variable leakdown chain drive tensioner assembly 14 is applied to the chain driven balance shaft drive 12, the variable leakdown chain drive tensioner assembly 14 may alternatively be applied to other chain driven components, which may include but are not limited to, chain drive components used to drive complex valve trains, oil pumps, high pressure fuel injection pumps and water pumps.

Figure 2:
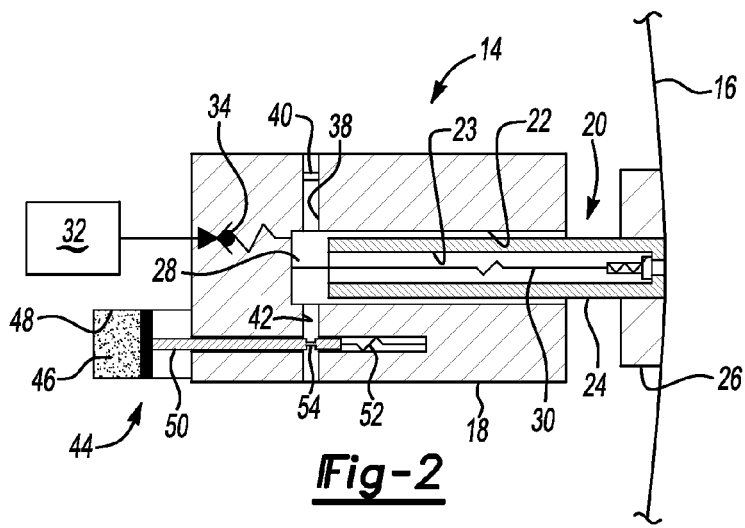
FIG. 2 is a schematic cross-sectional illustration of the chain drive tensioner assembly of FIG. 1 taken at the lines 2-2 in FIG. 1, with an actuator in a first position to open an additional leakdown path under a relatively cold oil temperature.

FIG. 2 is a schematic illustration of the chain drive tensioner assembly 14 of FIG. 1 and tensioning chain 16. The tensioner body 18 defines a bore 22. The tensioner piston assembly 20 has a tensioner piston portion 24 and a tensioner shoe portion 26.

The bore 22 and a tensioner piston cavity 23 of the tensioner piston assembly 20 cooperate to form a hydraulic chamber 28, which, as discussed further below, is substantially fluid-tight and, when filled with fluid (also referred to herein as oil), is characterized by a hydraulic stiffness that substantially prevents inward movement of the tensioner piston assembly 20 when under loading by the chain 16.

The tensioner piston portion 24 of the tensioner piston assembly 20 is installed within the bore 22 of the tensioner body 18. A spring 30 connects the tensioner body 18 and the tensioner piston assembly 20.

Hydraulic fluid is received within the chamber 28 of the tensioner body 18 from an oil supply 32, overcoming a ball check valve 34. When filled with hydraulic fluid, a hydraulic stiffness or tensioner reaction stiffness is created within the chamber 28, which substantially prevents inward movement of the tensioner piston assembly 20 when under loading by the chain 16. The oil supply 32 provides additional oil to the chamber 28 when chain loading lessens in order to replace oil that leaks from chamber 28 when under chain loading.

The tensioner body 18 includes a first leakage passage 38, also referred to as a first leakage path, in fluid communication with the chamber 28. A leakdown disk 40 is disposed within the first leakage path 38. The leakdown disk 40 is operable to regulate flow through the first leakage path 38 at a fixed flow rate based on pressure within the chamber 28 (i.e., dependent on the loading of the chain). However, because viscosity of oil within the hydraulic chamber 28 decreases as oil temperature increases, a greater volume of oil will flow out of the first leakdown path 38 at a higher temperature (and lower viscosity) than at a lower temperature (and higher viscosity). In typical chain drive temperature assemblies having only one leakdown path, as the leakage increases, the tensioner reaction stiffness decreases and, conversely, as the leakage decreases the tensioner reaction stiffness increases.

However, to compensate for the affect of increased leakage through the first leakage passage 38 as temperature increases, the valve body 18 defines a second passage 42, also referred to as a variable flow passage or a selective leakdown path, in fluid communication with the chamber 28. The second passage 42 is a selective leakdown path because an actuator 44 selectively blocks flow or permits flow through the second passage 42 as a function of temperature. Specifically, in the chain drive tensioner assembly 14, the actuator 44 is a thermal wax actuator that has thermal wax 46 confined within a piston cavity 48. Thermal wax motors or actuators are commercially available. The thermal wax 46 is selected based on its melting temperature in relation to the desired hydraulic stiffness of the chain drive tensioner assembly 14. At relatively low temperatures below the thermal wax melting temperature, the thermal wax is in solid form, such as is illustrated in FIG. 2. Thus, at a first oil temperature below the wax melting temperature, the thermal wax 46 occupies a relatively small space in the piston cavity 48, and a movable piston 50 in contact with the wax is biased by spring 52 to a first position as shown in FIG. 2. In the first position of FIG. 2, a narrowed portion 54 of the piston 50 aligns with the second passage 42 to permit oil flow out of the chamber 28 past the piston 50. Thus, at the first oil temperature (and at all oil temperatures below the thermal wax melting temperature), oil leakage is permitted through both the first and second passages 38, 42.

Figure 3:
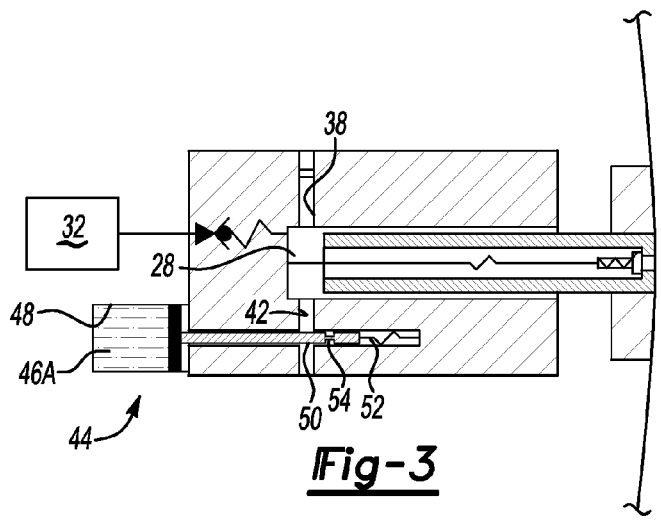
FIG. 3 is a schematic cross-sectional illustration of the chain drive tensioner assembly of FIG. 2, with the actuator in a second position to close the additional leakdown path under a relatively hot oil temperature.

However, at relatively high temperatures at or above the thermal wax melting temperature, the thermal wax melts, indicated as 46A in FIG. 3, expanding to occupy greater space within the piston cavity 48 and overcoming the bias of spring 52 to move the piston 50 such that the narrowed portion 54 is out of alignment with the second passage 42 and the piston 50 blocks oil flow out of the second passage 42. Thus, at a second oil temperature at or above the wax melting temperature, as indicated in FIG. 3, leakage is permitted only from the first passage 38.

Figure 4:
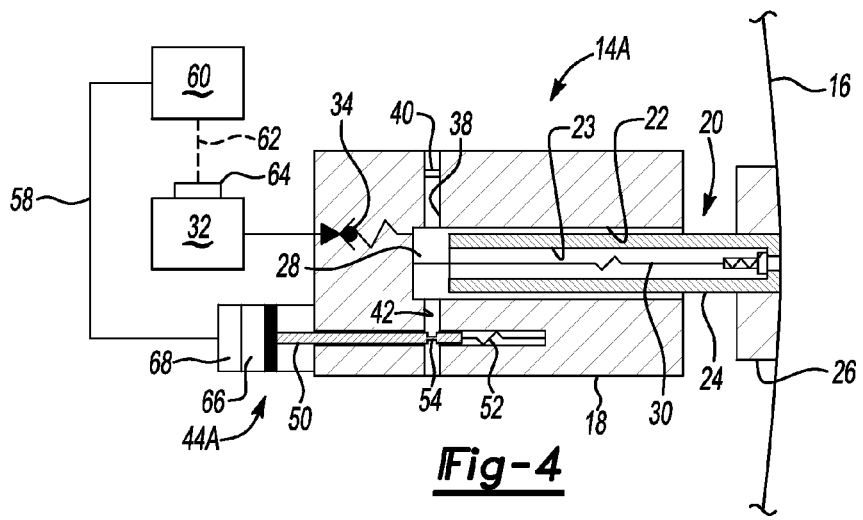
FIG. 4 is a schematic cross-sectional illustration of a second embodiment of a chain drive tensioner assembly for use with the engine of FIG. 1, with an electronically controlled actuator in the first position to open the additional leakdown path under the relatively cold oil temperature.
Figure 5:
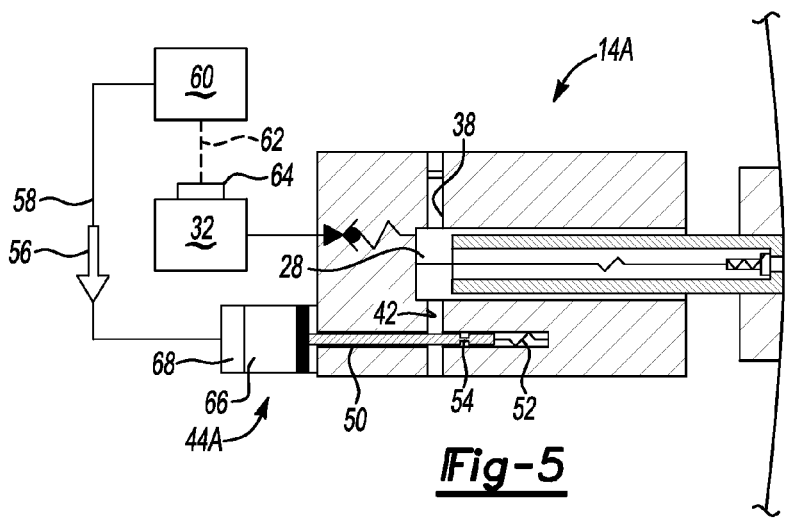
FIG. 5 is a schematic cross-sectional illustration of the chain drive tensioner assembly of FIG. 4 with the actuator in a second position to close the additional leakdown path under the relatively hot oil temperature.

Referring to FIGS. 4 and 5, a second embodiment of a chain drive tensioner assembly 14A is illustrated. The chain drive tensioner assembly 14A may be used in place of chain drive tensioner assembly 14 in the engine assembly 10 of FIG. 1. Components of the chain drive tensioner assembly 14A substantially identical to those of the chain drive tensioner assembly 14 are represented with identical reference numbers. In this embodiment, the actuator 44A operable to move the piston 50 from the first position of FIG. 4 to the second position of FIG. 5 is a pulse width modulated actuator. The actuator 44A is an electromechanical actuator, such as a solenoid, moving in response to an electronic control signal 56 sent along conductor wire 58 from an electronic controller 60. The electronic controller 60 receives a sensor signal 62 from a temperature sensor 64 in communication with oil in the fluid supply 32. The controller 60 processes the sensor signal 62 according to a stored algorithm and generates a control signal 56 corresponding to the sensed oil temperature. The sensor 64 is shown mounted in the oil supply 32, but may be anywhere in the engine assembly where a temperature corresponding with oil temperature may be sensed, including within the chamber 28.

A power converter 68 utilizes power electronics to direct a pulse width modulated current or voltage corresponding to the control signal to a solenoid 66 within the actuator 44A. The power electronics are connected with a power source, such as a battery (not shown), that supplies power converted to a pulse width modulated voltage or current by the power electronics. The solenoid 66 responds to the pulse width modulated voltage or current to cause linear movement of the piston 50 corresponding to the pulse width modulated current or voltage. The pulse width modulated actuator 44A may be finely tuned to control movement of the piston 50 to multiple intermediate positions between the first position of FIG. 4 and the second position of FIG. 5, where the thinned portion only partially aligns with the second passage 42 to control the passage 42 to partially open (i.e., partially blocked) states between the open state of FIG. 4 and the blocked (i.e., closed) state of FIG. 5. Thus, the leakage from the second passage 42 may be finely tuned in correlation with oil temperature over a range of temperatures.

While the best modes for carrying out the invention have been described in detail, those familiar with the art to which this invention relates will recognize various alternative designs and embodiments for practicing the invention within the scope of the appended claims.

The invention claimed is:

1. An apparatus for tensioning a chain, comprising:
   a chain drive tensioner assembly having:
      a tensioner body with a bore therein;
      a piston portion movable within the bore; and
      a shoe portion connected with the piston portion and configured to contact the chain; wherein the piston portion moves within the bore due to force from the chain to cause oil to leak from the bore with tensioning of the chain by the chain drive tensioner assembly decreasing as oil leakage from the bore increases; wherein the tensioner body defines a first passage in fluid communication with the bore and operable to leak oil from the bore in an amount that increases as temperature of the oil increases; and wherein the tensioner body defines a variable flow passage in fluid communication with the bore;

an actuator movable in response to a predetermined temperature between a first temperature and a second temperature greater than the first temperature to at least partially block the variable flow passage; wherein the first passage is not blocked by movement of the actuator and is therefore operable to leak oil at both the first and second temperatures; and wherein the variable flow passage is operable to leak oil at the first temperature and the actuator at least partially prevents leakage of oil through the variable flow passage at the second temperature so that the variable flow passage provides a first amount of oil leakage from the bore at the first temperature and a second amount of oil leakage from the bore at the second temperature greater than the first temperature; and wherein viscosity of leaked oil is greater at the first temperature than at the second temperature and the second amount of oil leakage is lower than the first amount of oil leakage.

2. The apparatus of claim 1, wherein the actuator is a thermal wax actuator.

3. The apparatus of claim 1, wherein the actuator is an electronically controlled actuator.

4. The apparatus of claim 3, further comprising:

an electronic controller operable to monitor temperature of the chain drive tensioner assembly; wherein the actuator is a pulse width modulated actuator operatively connected to the controller and configured to vary oil leakage in response to a control signal from the controller.

5. An apparatus for tensioning a chain, comprising:

a chain drive tensioner assembly operatively connected with the chain and having:

a tensioner body with a bore therein;

a piston portion movable within the bore and defining with the bore a hydraulic chamber containing oil; and a shoe portion connected with the piston portion and configured to contact the chain; wherein the piston portion moves within the bore due to force from the chain to cause oil to leak from the hydraulic chamber with tensioning of the chain by the chain drive tensioner assembly correlated with oil leakage from the hydraulic chamber;

wherein the assembly defines a first oil leakdown path in continuous fluid communication with the hydraulic chamber providing continuous oil leakage from the hydraulic chamber when under force from the chain and a second oil leakdown path in selective fluid communication with the hydraulic chamber selectively providing additional oil leakage from the hydraulic chamber under predetermined temperature conditions when under force from the chain.

6. The apparatus of claim 5, wherein the predetermined temperature conditions correspond with temperature and viscosity of oil in the hydraulic chamber.

7. The apparatus of claim 5, wherein the chain drive tensioner assembly includes an actuator movable to block the second oil leakdown path under the predetermined temperature conditions.

8. The apparatus of claim 7, wherein the actuator is a thermal wax actuator.

9. The apparatus of claim 7, wherein the actuator is an electronically controlled actuator.

10. The apparatus of claim 9, further comprising:

an electronic controller operable to monitor temperature of the chain drive tensioner assembly; wherein the actuator is a pulse width modulated actuator operatively connected to the controller and configured to move to vary oil leakage from the second oil leakdown path in response to a control signal from the controller.

* * * * *